United States Patent [19]

Leone

[11] 4,258,496
[45] Mar. 31, 1981

[54] LOBSTER TRAP

[76] Inventor: Anthony J. Leone, 3301 Raleigh St., Hollywood, Fla. 33021

[21] Appl. No.: 79,184

[22] Filed: Sep. 26, 1979

[51] Int. Cl.³ .............................................. A01K 69/08
[52] U.S. Cl. .................................................... 43/102
[58] Field of Search ................ 43/100, 102, 103, 105, 43/66

[56] References Cited

U.S. PATENT DOCUMENTS

| | | | |
|---|---|---|---|
| 3,045,386 | 7/1962 | Coyne | 43/100 |
| 3,245,173 | 4/1966 | Sylvester | 43/102 X |
| 3,271,894 | 9/1966 | Manno | 43/100 X |
| 3,708,905 | 1/1973 | Jalbert | 43/100 |
| 3,821,861 | 7/1974 | Jalbert | 43/100 |
| 3,826,032 | 7/1974 | Torngren | 43/100 |
| 4,184,283 | 1/1980 | Wyman | 43/102 |

FOREIGN PATENT DOCUMENTS

| | | | |
|---|---|---|---|
| 532931 | 11/1956 | Canada | 43/102 |
| 2398454 | 3/1979 | France | 43/102 |
| 1370345 | 10/1974 | United Kingdom | 43/100 |

*Primary Examiner*—Gary L. Smith
*Assistant Examiner*—Robert P. Olszewski
*Attorney, Agent, or Firm*—John Cyril Malloy

[57] ABSTRACT

An improved lobster trap composed of a one-piece molded plastic hollow trap body defining a main interior chamber, a door to close and open and gain access for removing lobsters trapped in the chamber, and a lobster trap opening provided with a guide path for entering lobsters and which guide path terminates in the central zone of the trap in spaced relation from the walls, top and bottom, so that a lobster following the guide path would fall into the chamber, attracted by bait. The body and the door are of openwork construction, said body having a plurality of openings in spaced relation from one another throughout the surface thereof.

6 Claims, 12 Drawing Figures

LOBSTER TRAP

FIELD OF THE INVENTION

This relates to lobster traps.

BACKGROUND OF THE INVENTION

In the past, as is perhaps well known, many many lobster traps are utilized. Often these lobster traps are made of wooden materials composed of spaced members defining an open work construction which are somehow secured together, as by fasteners. Conventionally, such traps include an opening with an interiorly extending net defining a guide through which lobsters creep to be captivated within the interior of the open work construction for removal subsequently through an access door.

OBJECTS OF THE INVENTION

This invention has an object the provision of a trap which is composed of a body of one-piece molded plastic construction which is rigidified by reason of structure configurations as described more fully hereinafter and which is provided with an interior trap having a fall-through opening for a lobster creeping along the guide way which terminates at a location spaced from the walls, top and bottom, so that a lobster falling from it will be trapped within the main chamber of the lobster trap and wherein an access door with a keeper is provided for removing lobsters trapped by the device.

It is another object of this invention to provide a lobster trap of the type described hereinafter which is simple in construction, inexpensive to manufacture, well adapted for the purposes for which it is intended, is composed of a body of rigid molded plastic material, preferably polyethylene which may or may not have carbon black in it as a pigment which seems to attract lobsters, and generally, is of such a construction and material so that barnacles do not adhere to it, sea turtles cannot smash it, like often happens with wooden lobster traps, because the polyethylene is relatively rigid and somewhat bendable so as to yield to impact and which is long-lasting and which may be readily seen beneath water by reason of the black color in the embodiment in which the same is used and which is generally in accordance with the purposes which will become apparent hereinafter.

In accordance with these and other objects which have become apparent hereinafter, the instant invention will now be described with reference to the accompanying drawings in which:

DESCRIPTION OF THE DRAWINGS

Drawings Illustrating First Preferred Embodiment

Drawings Illustrating Second Preferred Embodiment

Figure 5:
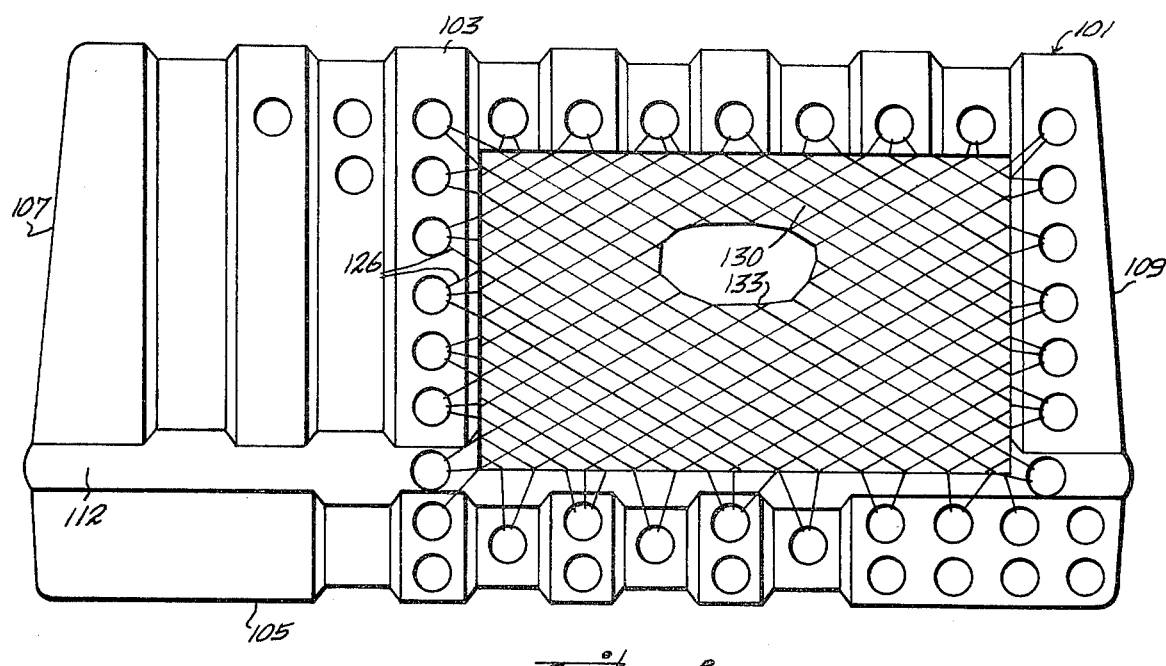
Figure 6:
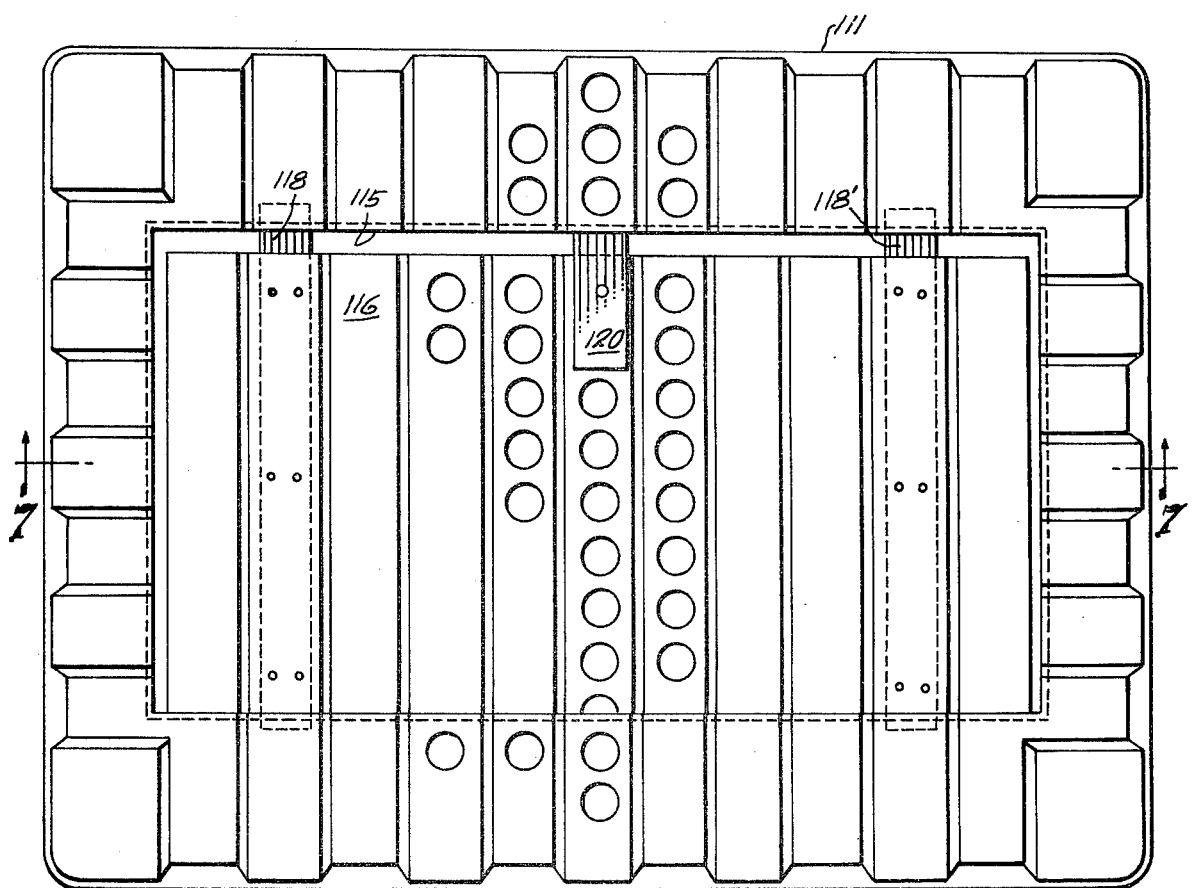
Figure 7:
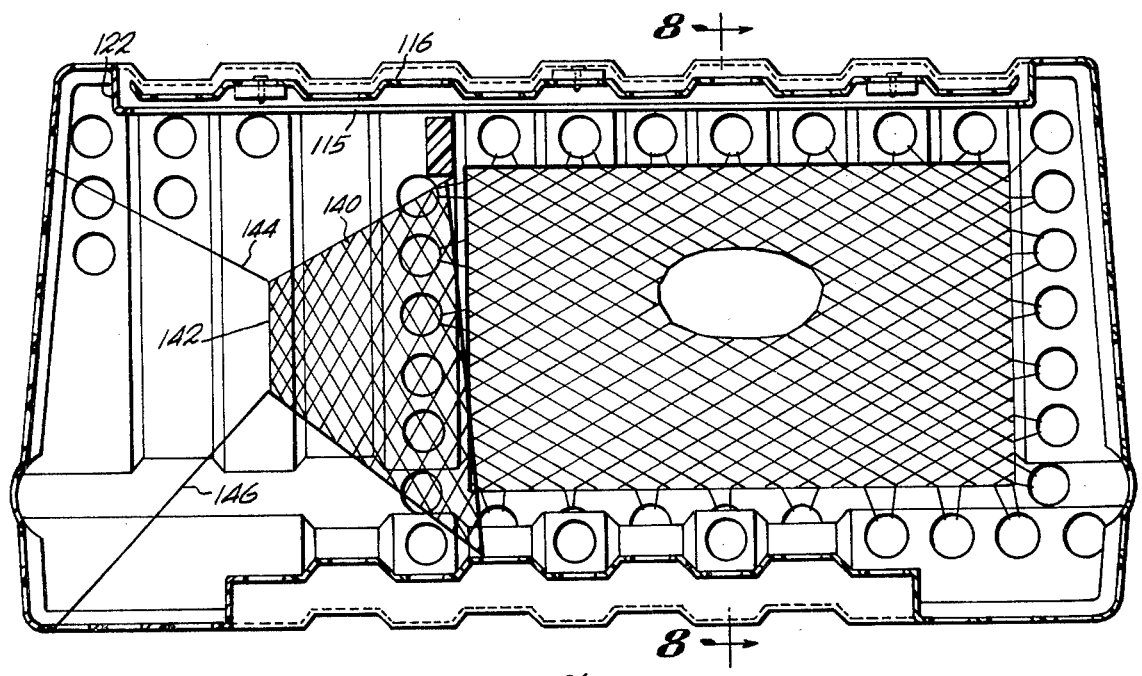
Figure 8:
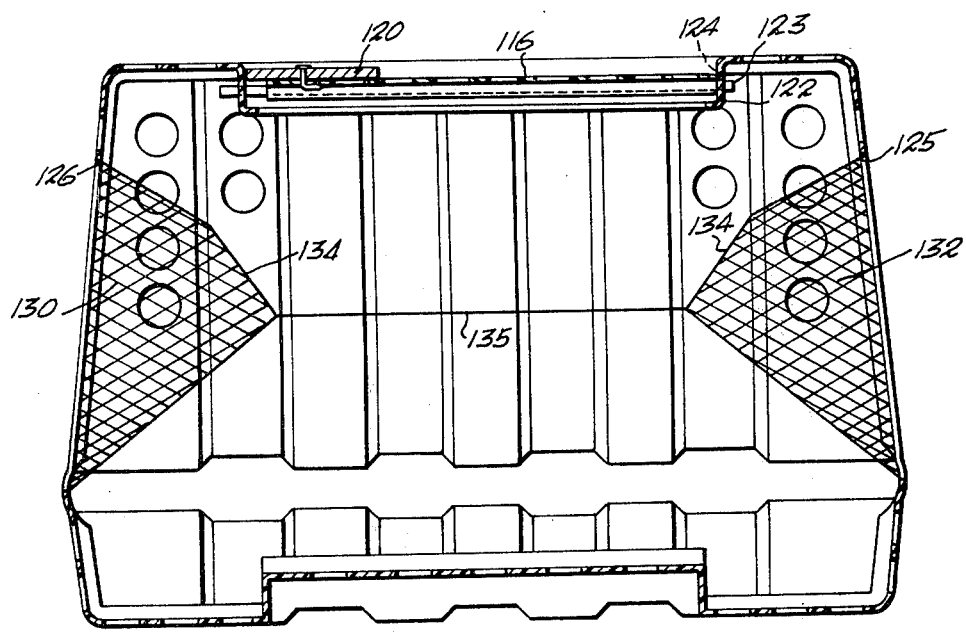

FIG. 5 is a side elevation view of a lobster trap constructed in accordance with this invention;

FIG. 6 is a top plan view of a trap constructed in accordance with this embodiment;

FIG. 7 is a view in cross section taken on the plane indicated by the line 7—7 of FIG. 6 and looking in the direction of the arrows; and FIG. 8 is a view in cross section taken on the plane indicated by the line 8—8 of FIG. 7 and looking in the direction of the arrows.

Drawings Illustrating Third Preferred Embodiment

The third preferred embodiment is shown in FIGS. 9, 10, 11, and 12.

Figure 9:
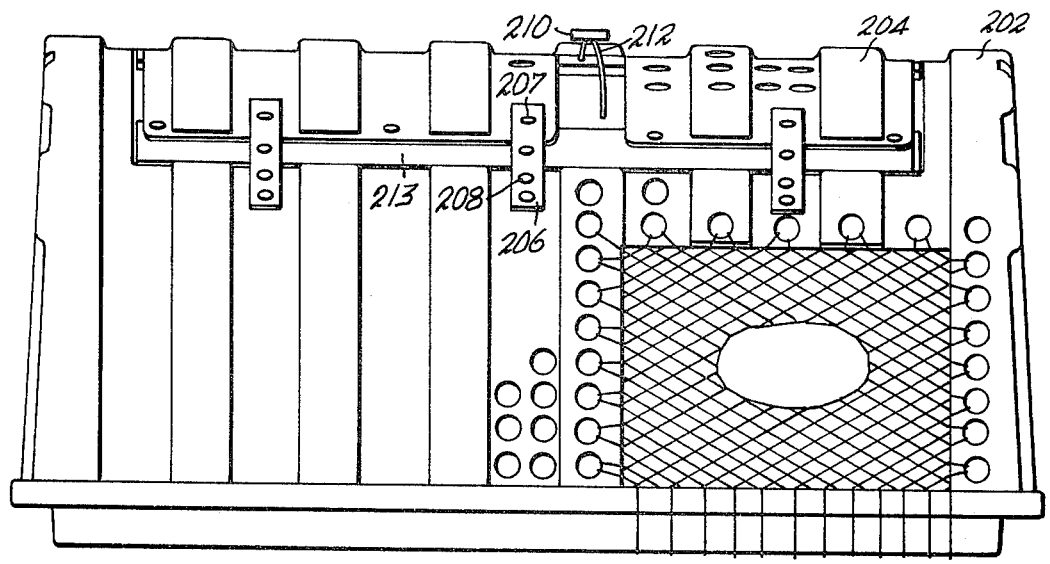
Figure 10:
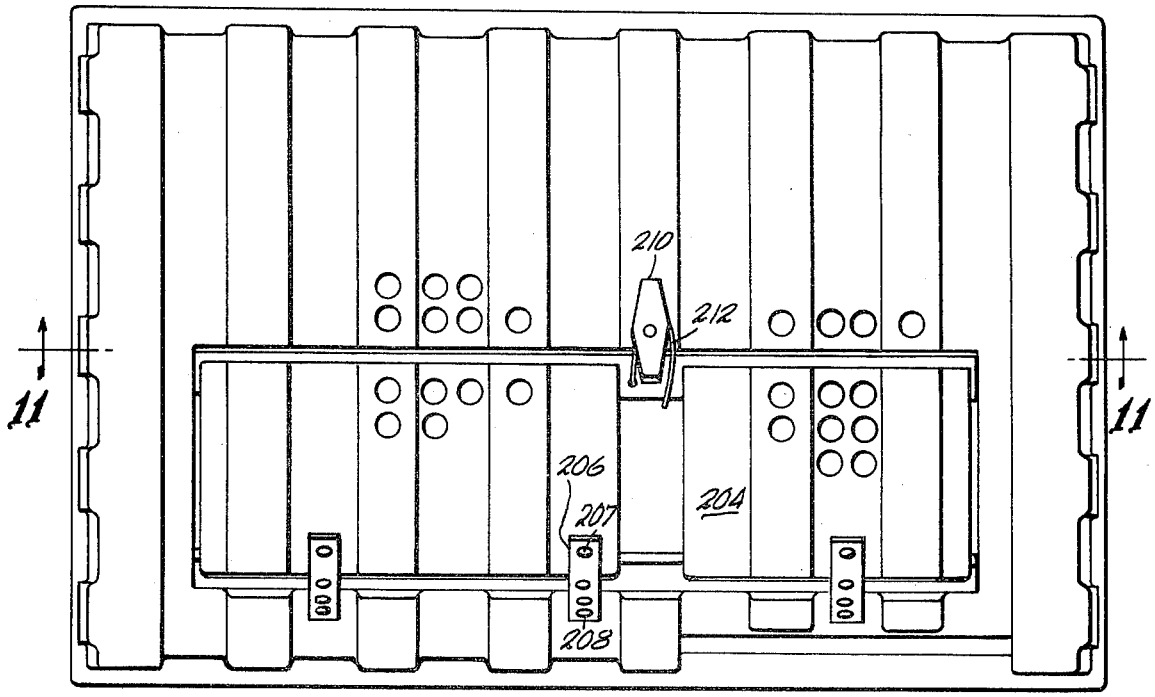
Figure 11:
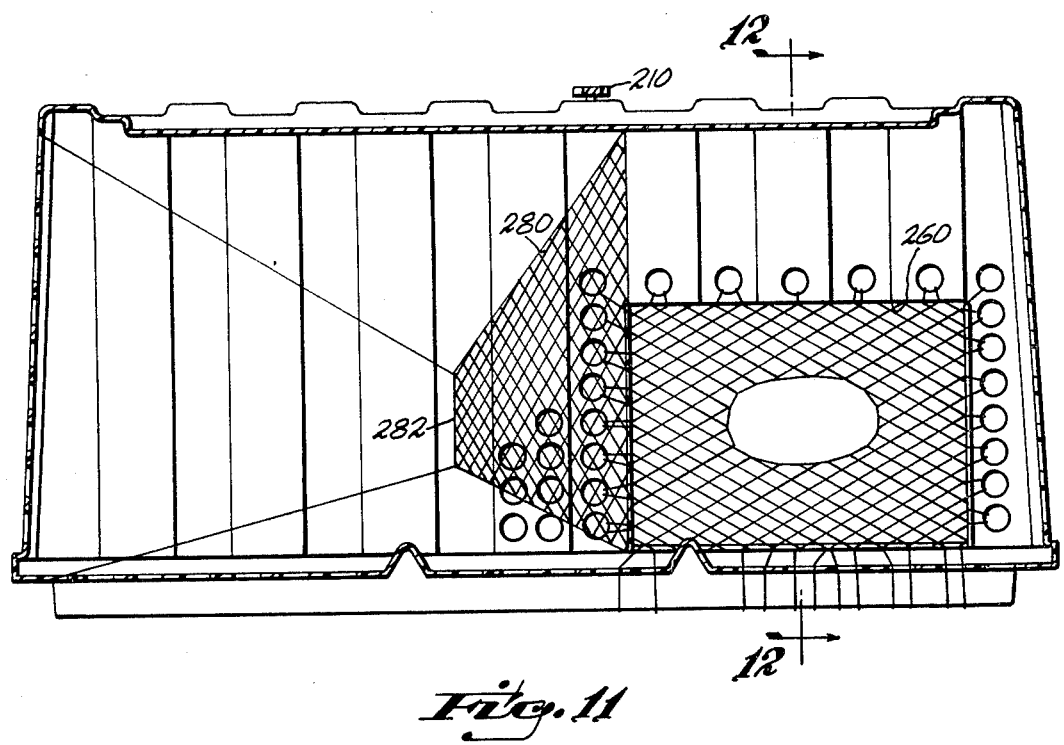
Figure 12:
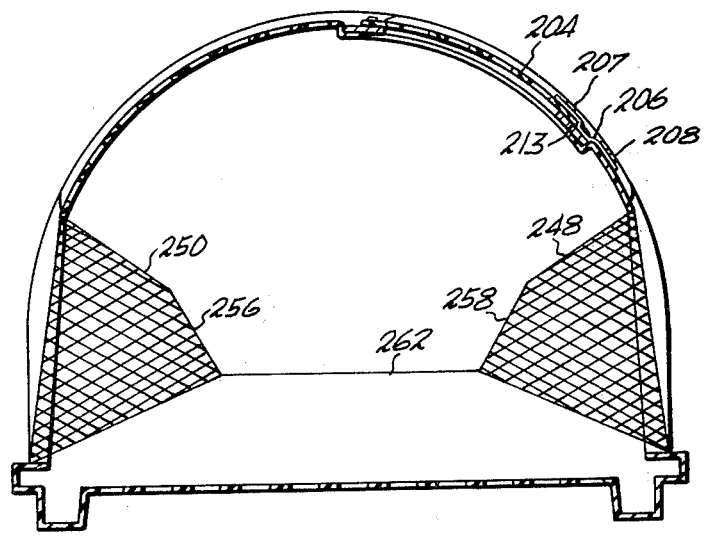

FIG. 9 is a side elevation view of the third preferred embodiment;

FIG. 10 is a top plan view of the third embodiment;

FIG. 11 is a view in cross section taken on the plane indicated by the line 11—11 of FIG. 10 and looking in the direction of the arrows; and FIG. 12 is a view in cross section taken on the plane indicated by the line 12—12 of FIG. 11 and looking in the direction of the arrows.

DESCRIPTION OF FIRST PREFERRED EMBODIMENT

Figure 1:
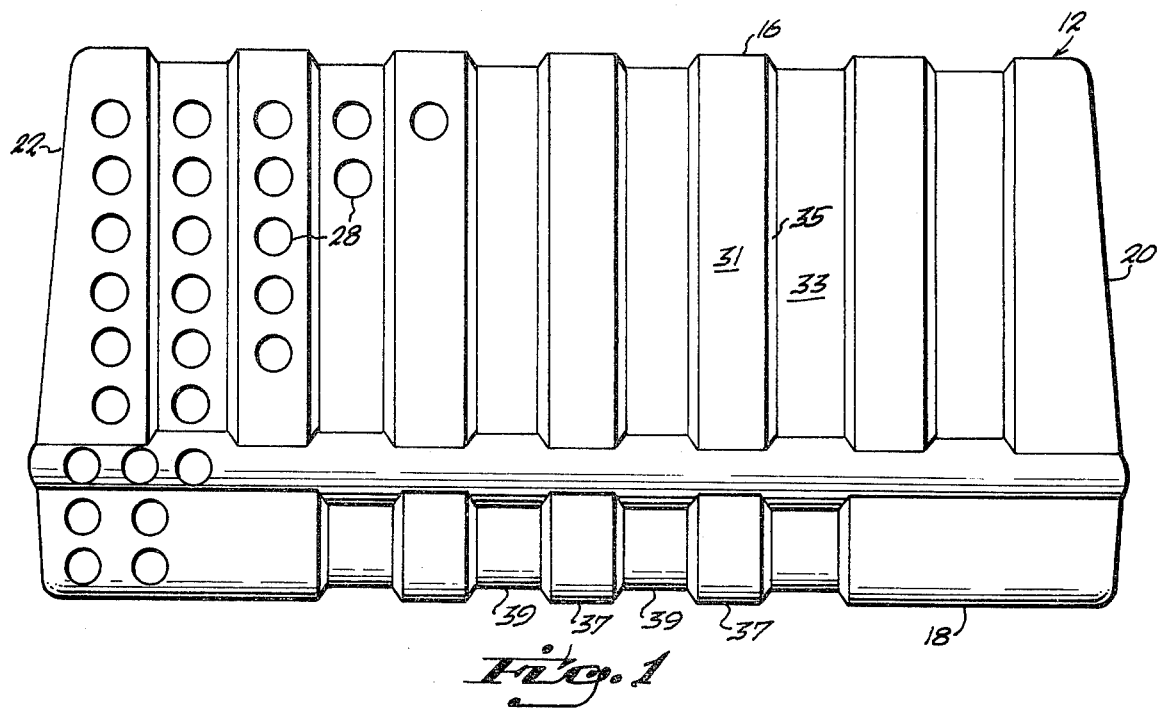
FIG. 1 is a side elevation view of the lobster trap of the instant invention.
Figure 2:
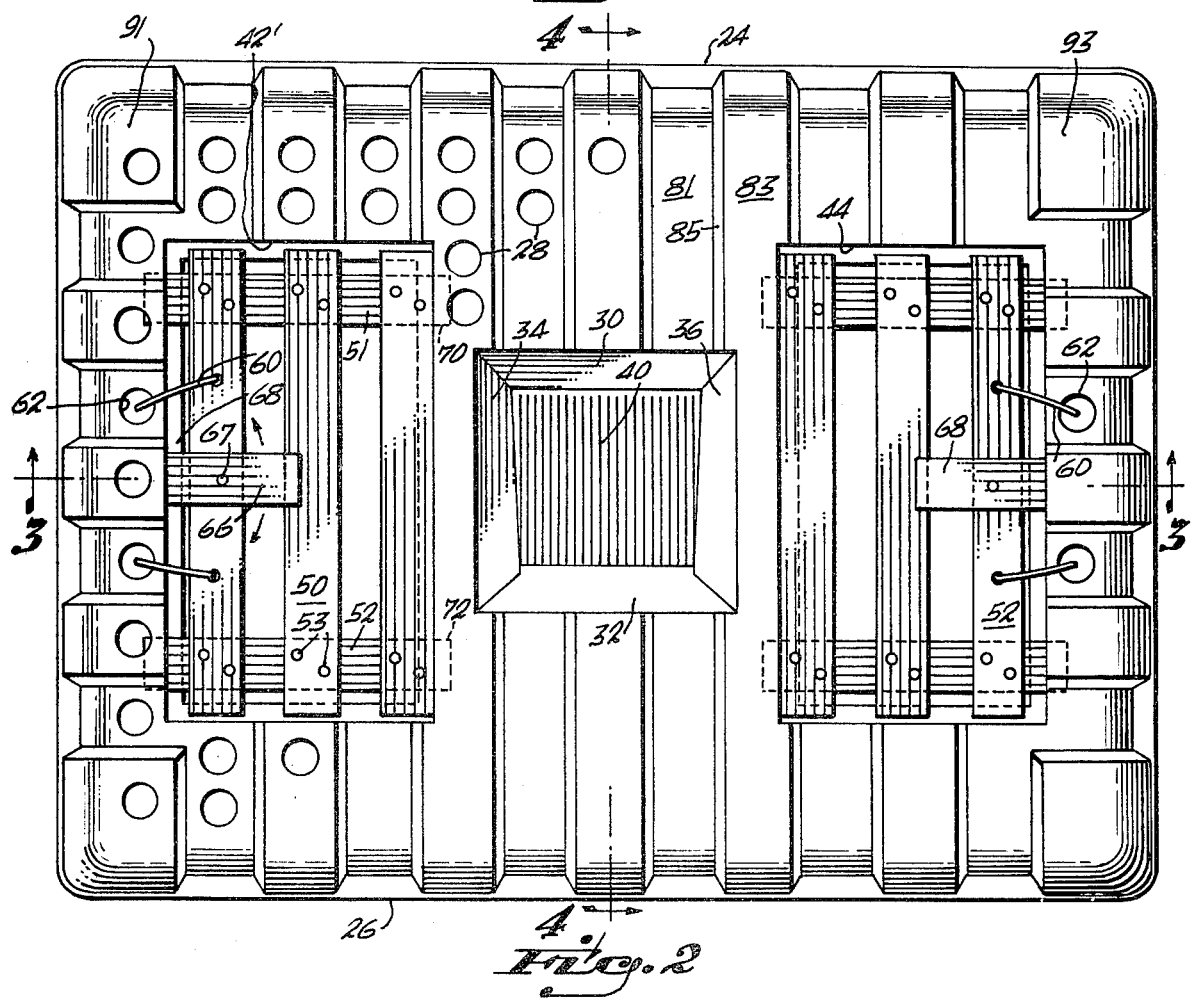
FIG. 2 is a top plan view of the trap shown in FIG. 1.
Figure 3:
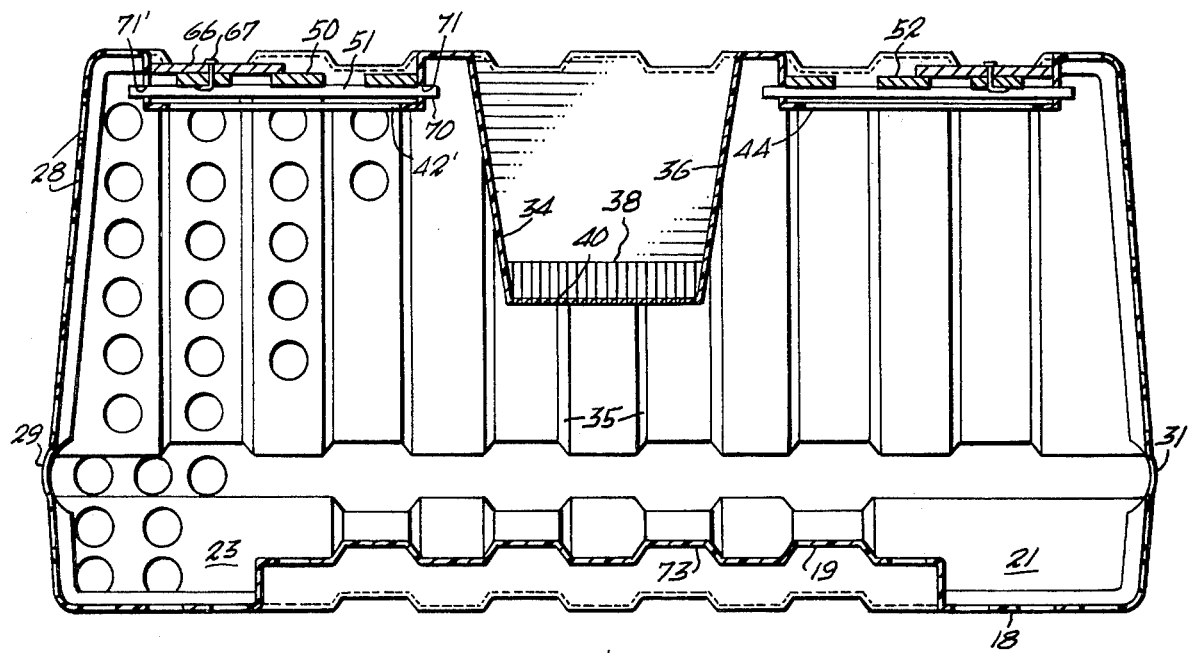
FIG. 3 is a view taken on the plane indicated by the line 3—3 of FIG. 2 and looking in the direction of the arrows.

Referring to FIGS. 1 through 4 wherien like reference characters designate like or corresponding parts throughout the several views and referring to FIG. 1, a lobster trap, generally designated by the numeral 12, is illustrated. It comprises a hollow body of relatively rigid molded one-piece plastic construction. It encloses a chamber, the body defining a top 16, a bottom 18, ends 20 and 22 and front and rear walls 24 and 26 which are joined together. Each of the walls has a plurality of holes 28 spaced from one another some of which are shown but it is understood that the same are throughout the body so that an openwork molded one-piece plastic construction is defined. The ends and front and rear walls are provided with a peripheral bead, see FIG. 3, as at 29 and 31, which bead is adjacent and somewhat above the level of the bottom, and preferably about one-fourth of the overall height in the illustrated embodiment. In the embodiment, the walls taper convergingly upwardly and downwardly from this bead to the top and bottom respectively. As best seen in FIGS. 1 and 3, the upper tapered wall portions and the top are generally corrugated defining a wall and top rigidifying pattern in relief. This pattern in relief is composed of debossed or depressed inwardly spaced zones which extend generally vertically in the case of the walls and laterally in the case of the top and are contiguous or joined. In the case of the side walls, such as 33, these inner strip zones are connected to the outer main wall surface by outwardly converging zones, such as 35 on opposite sides of the main outer surface strip zones such as the one on which the numeral 31 is located; and, as in the case of the top, the outer zone is designated by the numeral 83 while the inner depressed strip zone is designated by the numeral 81 and the inner and outer zones are joined to one another as by the connector strip 85. Similarly, the bottom and the lower zone of the side walls are provided with a rigidifying pattern in relief in the central zone between the end walls 20 and 22 and side walls 24 and 26, the depressed or inner zones being designated by the numeral 39, see FIG. 1, and the outer zones being designated by the numeral 37.

Referring now to FIG. 3, in the top, a central trap opening is defined, and it is bounded by a skirt composed of downwardly converging inner partial walls 30 and 32 and 34 and 36. These partial walls lead to a flap 40 which from the top appears as a slitted floor, see FIG. 4, which is, preferably, inclined as shown. The floor is a hinge flap which is bendable in response to a downward force such as the weight of a lobster and it is composed of parallel strips 40, by providing slits in the panel 40, as best seen in FIG. 2, which extend to the hinge axis of the flap at 38.

The top is also provided with two openings 42' and 44; these access openings are for removing lobsters from the trap. The access openings are outboard of the central opening and each is provided with a short depending skirt extending into the body, each skirt has an open end and in each skirt there is a pair of aligned holes 71 and 71', see at the upper left of FIG. 3. Each of these access openings is provided with a door such as 50 and 52, each of which is sized to fit in closing relation of one of the openings and is now to be described.

Referring to FIG. 2, the left side door 50 includes a pair of spaced members 51 and 52 each of a length greater than the span of the opening 50 such as 70 and 72. These members 51 and 52 are normally slidably captivated beneath the trap body top in the skirt holes such as the end 70 in the hole 71 of the partial wall skirt beneath the top as shown by the dotted lines in FIG. 2. The spaced door members are connected together by spanning members, such as that on which the numeral 50 appears on the left of FIG. 2, and secured together as by the fasteners 53, in effect defining as openwork door. A pivotable keeper 66, in the case of the left-hand door in FIG. 2, and 68 in the case of the right-hand door in FIG. 2, are provided. The keeper is pivotally connected to the door on a pivot pin, such as that designated by the numeral 67, for rotation in the direction of the arrowed lines. The door is loosely hingedly connected to the body as by the tie of rope or strand 60. For access, the doors may be moved toward one another, with the member 70 slidably moving within the opening such as 71, see at the upper left of FIG. 3, and the latch 66 is pivoted out of the way, in the case of the door 50, for gaining access to the interior of the trap for removing lobsters therefrom.

Figure 4:
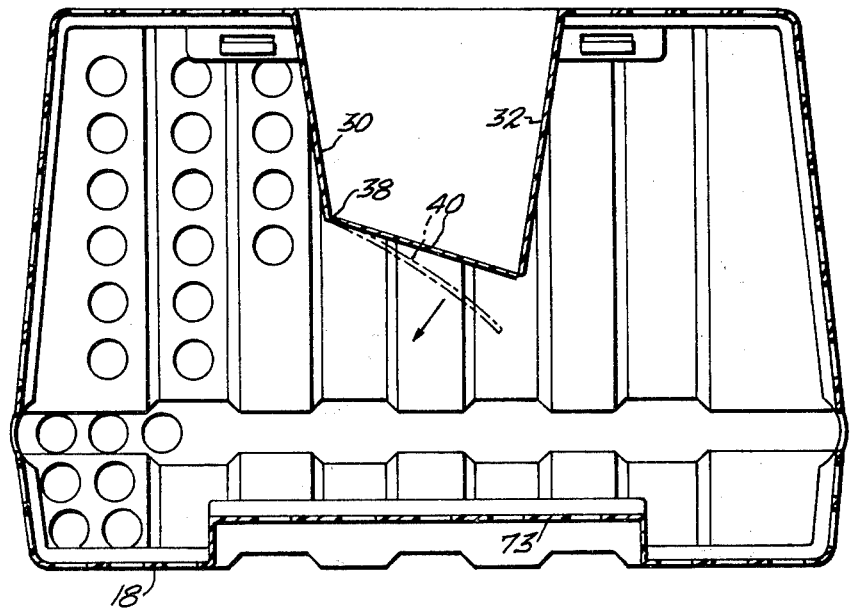
FIG. 4 is a view taken on the plane indicated by the line 4—4 of FIG. 2 and looking in the direction of the arrows.

With respect to the bottom, the central zone 73 is raised somewhat, see FIGS. 3 and 4 so as to define outer corner feet, such as that designated by the numeral 18 in FIGS. 1 and 3, and, as shown in FIG. 2. In these corner peripheral zones, such as 21 and 23, or feet weights if desired may be positioned to keep the trap on the bottom.

In use, the trap is positioned in water with the doors closed. A lobster attracted by bait within the openwork construction of the plastic strap, will enter the mouth, see FIG. 4, and since the skirt walls converge downwardly soon be on the inclined flap-type floor of strip construction 40 continually urged, by the incline thereof, see FIG. 4, to the relatively weak end zone for hinged movement with the strips about the hinge 38, where the strips are connected to the wall 30.

The lobsters thus trapped may be removed by manipulating the doors in the manner described above.

DESCRIPTION OF SECOND PREFERRED EMBODIMENT

This embodiment, see FIGS. 5–8, of the lobster trap 101 is composed of a top generally designated by the numeral 103, bottom 105, end walls such as 107 and 109 and front and rear walls 111 and 113, which are rigidified by the deformed or generally corrugated one-piece molded relatively rigid plastic construction defined in connection with the embodiment of FIG. 1. The peripheral bead 112 is provided also, as described with reference to the first preferred embodiment. The top is provided with a cutout 115 with a depending skirt 122 having slots, see 124 in FIG. 8. The cutout portion from the top is utilized as the door 116; and it is foreshortened somewhat yet sized to be maintained in use in generally closing relation of the cutout 115 by members, such as that designated by the numeral 118 and 118', having and end 123, see FIG. 8, receivable slidably within the slot in the skirt 122 for adjustable movement to clear it when the latch 120 is pivotally rotated, see FIGS. 6 and 8. It is thus seen that this type door may be completely moved by manipulating it after the keeper or latch 120 has been pivoted out of the way.

Referring now to FIG. 8, generally cone-shaped nets 130 and 132 which are generally inwardly converging, are provided; and one of each is secured peripherally as at 125 and 126 about an opening in the front and rear walls. It will be seen that the mouth 134 of each net is generally upwardly facing. Hence, a lobster attracted by bait within the trap will enter through the opening to the boundry zone of which the net is tied bounded as at 125 and 126 creeping up one of the nets 130 or 132 and falling into the trap over the brink edge at the mouth 134, or see FIG. 5, 133. The nets are secured together by a tie line 135 so as to be taught. A lobster creeping through one of the nets will fall into the main chamber or interior of the lobster trap. Irrespective of which manner in which the lobster enters the trap, he will again be attracted by bait along an interior net 140, see FIG. 7, which spans the left-hand side of the trap, see FIGS. 5 and 7, and traveling upwardly across the cone-shaped net 140 and through the mouth 142 which is held in an open position by the tie lines 144 and 146, becoming trapped in the left-hand side interior of the trap. It is thus seen that a dual trapping mechanism of simple construction is provided for lobsters by this construction.

DESCRIPTION OF THIRD PREFERRED EMBODIMENT

In this embodiment, see FIGS. 9–12, the trap body 202 is of generally similar construction to that described on reference to the first and second embodiments and is provided with an opening in the top closed by a hingedly connected door 204, the door being connected to the body by means of hinge straps, such as 206, of flexible material which are secured at their ends, as at 207 and 208, to one edge of the door for swinging opening movement of it. A keeper 210 is provided and includes the tie strap 212 for tying the door in a closed position or releasing it for hingedly opening it. The keeper 210 being secured to the top, as seen in FIG. 11 and a flap may be provided on the swing edge of the door, see 213. Within the trap of this embodiment, which is somewhat dome-shaped as shown in FIG. 12, but still of the same rigidified construction described above, nets 248 and 250 extend inwardly as shown in FIG. 12, from front and rear openings, such as that designated by the numeral 260 in FIG. 11 to an upwardly opening mouth, such as 256 and 258, with the nets being secured together by tie means 262 so as to keep them taut. A lobster entering the trap attracted by bait, will find himself within the body. Once again such a lobster will further be attracted by the bait to travel thereafter through the secondary interior net 280 and out the mouth 282 into the interior dual trapped zone at the left-hand side of FIG. 11.

It is thus seen that there is shown three preferred embodiments of a one-piece molded rigidified trap construction made of relatively light-weight corrosion resistant rigid plastic construction for a lobster trap which is provided in each embodiment with a door for gaining access for removing lobsters trapped within it and which includes cutout zones spanned by a net-type or trap-type member through which a lobster is able to pass into the interior of the trap to be captivated and, in the case of the second and third embodiments, into a second trapped zone presenting in either case a tortuous path to escape which cannot be surmounted and further that the trap includes access doors for removing the lobsters thus trapped.

While the instant invention has been shown and described herein in what is conceived to be most practical and preferred embodiments, it is recognized tht departures may be made therefrom within the scope of the invention, which is therefore not to be limited to the details disclosed herein but is to be accorded the full scope of the claims so as to embrace any and all equivalent apparaus and articles.

What is claimed is:

1. In combination, a lobster trap comprising a hollow body of relatively rigid molded one-piece plastic construction defining an interior chamber and said body including a top, bottom, end and front and rear walls having a plurality of holes therethrough spaced from one another and providing an openwork molded one-piece plastic trap construction, said end and front and rear walls being provided with a peripheral rigidifying bead adjacent the bottom, said end, front and rear walls converging upwardly to the top from said peripheral bead and extending downwardly to the bottom from said peripheral bead, said wall having spaced raised and lower zones joined together defining a rigidifying pattern in relief, and a lobster trap opening in the walls and means defining converging surfaces for a lobster guide terminating at a mouth in the trap chamber in spaced relation from the top, bottom and walls and through which a lobster is adapted to fall into the trap chamber and said trap having an access opening in the top, said trap including a door and keeper means normally maintaining said door in closing relation of the access opening, said body and said door including mutually interengageable keeper means portions for interconnecting the door and the trap;

said access door comprising a plurality of interconnected members defining an openwork door sized for spanning said access opening and said mutually interengaging means comprises a downwardly extending skirt on the top of said trap and a plurality of holes aligned with one another on opposite sides of said skirt, said holes being sized to receive projections on said door for sliding movement of the door into and out of a position from which the door may be removed from closing relation of the opening for normal closing relation of the opening.

2. The device as set forth in claim 1 wherein two spaced and similar access openings and a door means for each access opening are provided.

3. The device as set forth in claim 1 wherein the central zone of said floor is provided with an inwardly extending recess defining footed corner zones adapted to receive weights.

4. The device as set forth in claim 1 wherein the side walls are provided with a cutout and a net is included, said net extending inwardly and upwardly to a open mouth and tie means are provided to maintain the net in a taut condition.

5. The device as set forth in claim 4 wherein an interior net is provided of generally truncated cone-shape suspended in the interior chamber of the trap separating it into a primary and secondary zone, said interior net extending between the top and the bottom and spanning the chamber and extending from a larger opening mouth in the primary zone in converging relation to an interior small mouth in the secondary trap zone and said small mouth being in spaced relation from the top, bottom and walls of the trap.

6. In combination, a lobster trap comprising a hollow body of relatively rigid molded one-piece plastic construction defining an interior chamber and said body including a top, bottom, end and front and rear walls having a plurality of holes therethrough spaced from one another and providing an openwork molded one-piece plastic trap construction, said end and front and rear walls being provided with a peripheral rigidifying bead adjacent the bottom, said end, front and rear walls converging upwardly to the top from said peripheral bead and extending downwardly to the bottom from said peripheral bead, said wall having spaced raised and lower zones joined together defining a rigidifying pattern in relief, and a lobster trap opening in the walls and means defining converging surfaces for a lobster guide terminating at a mouth in the trap chamber in spaced relation from the top, bottom and walls and through which a lobster is adapted to fall into the trap chamber and said trap having an access opening in the top, said trap including a door and keeper means normally maintaining said door in closing relation of the access opening, said body and said door including mutually interengageable keeper means portions for interconnecting the door and the trap;

said trap opening comprising a plurality of four downwardly and converging skirt surfaces extending from the top to a terminal end and a flap-type plastic slitted door hingedly connected to the terminal end, said flap being inclined and being composed of strips of plastic material connected together along one edge of the skirt;

said access door comprising a plurality of interconnected members defining an openwork door sized for spanning said access opening and said mutually interengaging means comprises a downwardly extending skirt on the top of said trap and a plurality of holes aligned with one another on opposite sides of said skirt, said holes being sized to receive projections on said door for sliding movement of the door into and out of a position from which the door may be removed from closing relation of the opening for normal closing relation of the opening.

* * * * *